United States Patent [19]

Omodei-Sale et al.

[11] 3,895,113
[45] July 15, 1975

[54] ANTIFERTILITY METHODS EMPLOYING TRIAZOLOISOQUINOLINE DERIVATIVES

[75] Inventors: Amedeo Omodei-Sale, Voghera; Pietro Consonni; Leonard Lerner, both of Milan, all of Italy

[73] Assignee: Gruppo Lepetit S.p.A., Milan, Italy

[22] Filed: May 24, 1974

[21] Appl. No.: 473,261

[30] Foreign Application Priority Data
May 25, 1973 United Kingdom............... 25163/73
Aug. 22, 1973 United Kingdom............... 39789/73

[52] U.S. Cl. ................................................ 424/258
[51] Int. Cl. ...................... A61k 15/12; A61k 27/00
[58] Field of Search .................................... 424/258

[56] References Cited
FOREIGN PATENTS OR APPLICATIONS
883,836  10/1971  Canada
884,328  10/1971  Canada

*Primary Examiner*—Donald B. Moyer
*Attorney, Agent, or Firm*—Theodore Post; C. Kenneth Bjork

[57] ABSTRACT

Antifertility methods employing a triazoloisoquinoline derivative selected from 2-phenyl-5,6-dihydro-s-triazolo[5,1-a]isoquinoline of formula

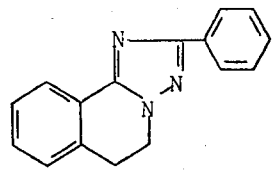

2-phenyl-s-triazolo[5,1-a]isoquinoline of formula

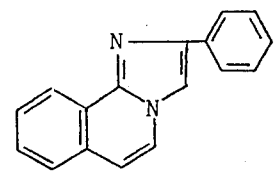

and a pharmaceutically acceptable acid addition salt thereof, together with any suitable pharmaceutical carrier.

2 Claims, No Drawings

ANTIFERTILITY METHODS EMPLOYING TRIAZOLOISOQUINOLINE DERIVATIVES

BACKGROUND OF THE INVENTION

2-Phenyl-s-triaxolo[5,1-a]isoquinoline and 2-phenyl-5,6-dihydro-s-triaxolo[5,1-a]isoquinoline are already known from Canadian Patents 884,328 and 883,836 respectively. However, the cited patents claim for these substances an activity as hydrogen halide acceptors and as corrosion inhibitors in aqueous ethylene glycol based cooling liquids.

SUMMARY OF THE INVENTION

The present invention relates to s-triazolo[5,1-a]isoquinoline derivatives. More particularly, this invention concerns the use as antifertility agents of compound selected from 2-phenyl-5,6-dihydro-s-triaxolo[5,1-a]isoquinoline, 2-phenyl-s-triazolo[5,1-a]isoquinoline and the pharmaceutically acceptable acid addition salts thereof.

Another purpose of this invention is to provide a method for preventing or interrupting pregnancy, said method consisting in administering to mammals an effective amount of one of the two above compounds or a pharmaceutically acceptable acid addition salt thereof.

A further purpose of the invention is to provide effective pharmaceutical compositions in dosage unit form containing as the active ingredient at least one of the above mentioned compounds or their pharmaceutically acceptable acid addition salts. The compound 2-phenyl-s-triazolo[5,1-a]isoquinoline is already known from Canadian Patent 884,328 and Chem. Ber. 104, 3965–3975, 1971. The compound 2-phenyl-5,6-dihydro-s-triazolo[5,1-a]isoquinoline is mentioned but not expressly disclosed in the Canadian Patent 883,836. However, the cited patents claim for these substances an activity as hydrogen halide acceptors, owing to their basic nature, and as corrosion inhibitors in aqueous ethylene glycol based cooling liquids.

Also a process for preparing the above compounds is therein described.

However, these substances can more advantageously be prepared through a method which consists in reacting 2-amino3,4-dihydro-isoquinoline-1(2)-one of formula

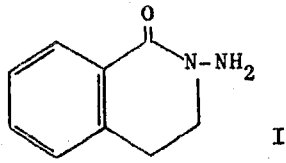

prepared as described in Belgin Patent 780,885, with a compound of formula

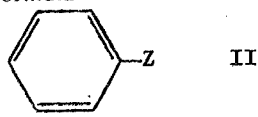

wherein Z represents one of the following groups:

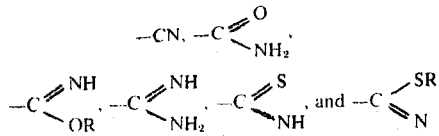

wherein R is $C_1$–$C_4$ alkyl, according to the three-step below outlined scheme:

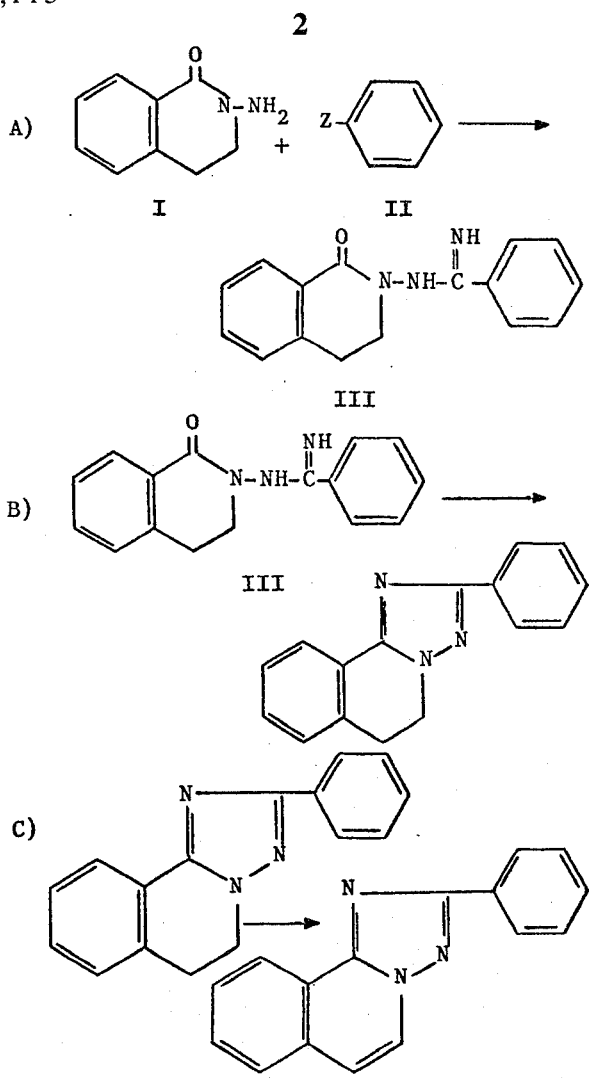

This route will extensively be illustrated in the Examples which will be given later.

Step (A) is carried out by treating compounds I and II for 3–30 hours at a temperature ranging from about 60° to about 160°C. The two reactants are contacted in substantially equimolecular ratios, though a slight excess of compound II may be advantageously employed. The reaction is preferably carried out in the presence of an acidic catalyst which may be a hydrohalide of the compound of formula III. The obtained product of formula III, may optionally be isolated and characterized or used in a crude state for the subsequent cyclization step. For this purpose it is dissolved in a solvent, e.g., a lower alkanol, according to step B, and the resulting solution is refluxed for 3–8 hours in the presence of a basic catalyst as, for instance, sodium hydride or alkali metals lower alkoxides. Then the reaction mixture is worked up according to known procedures and 2-phenyl-5,6-dihydro-s-triazolo 5,1-a]isoquinoline is obtained. This substance maybe optionally dehydrogenated to the corresponding 5,6-dehydro derivative according to step C.

Among the several useful dehydrogenating agents which may be employed are N-bromoacetamide, sulfur, bromine, lead tetraacetate mercuric acetate, chloranil, dichlorodicyanoquinone and manganese dioxide. This latter may be prepared in a wet state as described by E. Pratt and J. Van de Castle in J. Org. Chem. 26, 2973, 1961 and is employed under the conditions reported by J. Goldman et al. in J. Org. Chem. 34, 1979, 1969.

Generally, the reaction is carried out in the presence of a solvent, which is preferably selected from inert organic liquids, as, for instance, benzene, dioxane, tetrahydrofuran, carbon tetrachloride and the like. The catalyst may be added in the same proportion as the starting 2-phenyl-5,6-dihydro-s-triazolo[5,1-a]isoquinoline or in a considerably large molar excess. If manganese dioxide is used, it is easily removed from the reaction mixture by simple filtration.

After the reaction is completed and the catalyst is eventually filtered off, the resulting solution is evaporated to dryness and a residue is obtained which may be successively purified according to known procedures, such as, for instance, by column chromatography, by distillation under reduced pressure if the residue is an oily distillable substance, or by recrystallization from a suitable solvent if it is a solid.

As stated above, the two compounds known from the above cited Canadian Patents show a remarkable anti-fertility activity. In particular they show very interesting post-coital-post-implantation anti-fertility activity when administered subcutaneously to laboratory animals, e.g. rats, hamsters, dogs and monkeys. Moreover, their abortifacient activity is not accompanied by the other biological effects which are usually bound to hormonal substances. Fertility regulation can usually be achieved in a number of ways through the administration of hormonal substances. These can involve ovulation inhibition, ova transport, fertilization, implantation of the zygote, resorption of the fetus or abortion. Only with ovulation inhibition has there developed a successful method that is clinically useful.

The two above mentioned compounds allow an entirely new approach to this problem in which a non-hormonal substance can be administered parenterally or orally on a once or more times per month basis or as needed for a "missed period" or to induce termination of a more advanced pregnancy.

Post-coital-post-implantation activity of said compounds is investigated according to the following methods.

HAMSTERS

Female Syrian Golden Hamsters weighing 100–130 g. are employed in this screen. The animals are mated and the presence of sperm in the vagina is taken as evidence of mating. The day sperm is detected is considered as day one of pregnancy. Test compounds dissolved or suspended in sesame oil are administered subcutaneously and/or orally in doses of 25 mg/kg. daily for 5 days beginning on day 4 of pregnancy (days 4–[ ). The animals are autopsied on day 14 of pregnancy and the uteri are examined for evidence of pregnancy (implantation sites, fetal resorptions or live fetuses), hemorrage, and evidence of abnormalities of the uterus, placenta or fetuses. A compound is considered to be active if there is an absence of live fetuses in at least 60% of the treated animals. The compounds are then studied for dose-activity relationship and toxicity or other biological activities. Compounds that show 100% effectiveness with minimal side effects or toxicity are studied in depth.

In the following table there are reported the $ED_{50}$ values of the compounds tested. The $ED_{50}$ values identify the dose levels which show 100% effectiveness in 50% of the treated animals.

| Compound -s-triazolo[5,1-a]isoquinoline | $ED_{50}$ mg/kg. s.c. |
|---|---|
| 2-phenyl | 0.25 |
| 2-phenyl-5,6-dihydro | 1 |

RATS

Female Sprague-Dawley rats weighing 200–230 g. are mated under similar conditions described for the hamsters studied above. The same criteria and conditions are also employed with the exception that the animals are treated on days 6 through 10 of pregnancy and are autopsied on day 16.

2-Phenyl-5,6-dihydro-s-triazolo[5,1-a]isoquinoline proved to be active also in this experiment. Its $ED_{50}$ s.c. was found to be 18 mg/kg.

DOGS

Female Beagle dogs weighing approximately 10 kg. are mated and on the 20th day of pregnancy the animals are given single subcutaneous doses of the compounds to be tested.

On the 35th day of pregnancy, the animals are surgically opened and the uteri are examined for presence of fetuses, placental tissues etc. 2-Phenyl-s-triazolo[5,1-a]isoquinoline proved to be active also in this experiment. Its $ED_{50}$ s.c. was found to be 25 mg/kg.

2-Phenyl-s-triazolo[5,1a]isoquinoline and the corresponding 5,6-dihydro derivative have very low toxicity since generally their $LD_{50}$ values in mice are higher than 400 mg/kg. i.p. They may be administered by various routes; for example orally, subcutaneously, intravenously, or intramuscularly. For oral administration the substances are compounded in such forms as tablets, dispersible powders, capsules, granules, syrups, elixirs and solutions.

The compositions for oral use may contain one or more conventional adjuvants, such as, for instance, sweetening agents, flavoring agents, coloring agents, coating and preservative agents, in order to provide an elegant and palatable preparation.

Tablets may contain the active ingredient admixed with conventional pharmaceutical acceptable excipients, e.g. inert diluents such as calcium carbonate, sodium carbonate, lactose and talc, granulating and disintegrating agents, such as, for instance, starch, alginic acid and sodium carboxymethylcellulose, binding agents, e.g. starch, gelatin, gum-arabic and polivinylpyrrolidone and lubricating agents, e.g. magnesium stearate, stearic acid and talc. The tablets may be uncoated or coated by known techniques to delay disintegration and absorption in the gastrointestinal tract in order to provide long acting compositions.

Syrups, elixirs and solutions are formulated as known in the art. Together with the active compound they may contain suspending agents, such as, for instance methylcellulose, hydroxyethylcellulose, tragacanth and sodium alginate, wetting agents, e.g. lecithin, polyoxyethylene stearates and polyoxythylene sorbitan monooleate, and the common preservative, sweetening and buffering agents.

A capsule or a tablet may contain the active ingredient alone or admixed with an inert solid diluent, such as, for instance, calcium carbonate, calcium phosphate and kaolin.

Besides the oral route, other useful ways for administering the compounds of the invention may be suitably employed, e.g. the intravenous or the intramuscular administration. The active ingredient is thus embodied into injectable dosage forms. Such compositions are formulated according to the art and may contain appropriate dispersing or wetting agents and suspending or buffering agents identical or similar to those mentioned above. Sesame oil, benzyl benzoate, benzyl alcohol, peanut oil and their mixtures may be employed as suitable vehicles when the compounds are scarcely soluble in aqueous media.

The two above cited triazolo[5,1-a]isoquinoline derivatives may also be administered in the form of their non-toxic pharmaceutically acceptable acid addition salts.

Such salts possess the same degree of activity as the free bases, from which they are readily prepared by reacting the base with an appropriate acid and accordingly, are included within the scope of the invention. Representative of such salts are the mineral acid salts, such as, for instance, the hydrochloride, hydrobromide, sulfate, phosphate and the like and the organic acid salts such as the succinate, benzoate, acetate, p-toluenesulfonate, benzene sulfonate, maleate, tartrate, methanesulfonate, cyclohexylsulfonate and the like.

The dosage of active ingredient employed for preventing or interrupting pregnancy in mammals, may vary depending on the selected substance. Generally, good results are obtained when the two mentioned compounds are administered at a daily dosage of from about 0.8 to about 50 mg/kg. of animal body weight.

The dosage forms useful for this purpose generally contain from 20 to 800 mg. of the active ingredient in admixture with a solid or liquid pharmaceutically acceptable carrier or diluent.

The following Examples are given for the purpose of better illustrating the invention, but are not intended to establish any upper limit to the invention itself.

DESCRIPTION OF THE PREFERRED EMBODIMENTS

EXAMPLE 1

2-Phenyl-5,6-dihydro-s-triazole[5,1-a]isoquinoline.

A mixture of 16.2g. of 2-amino-3,4-dihydro-1(2H)-isoquinolinone (0.10 mole), 22.3 of benzimidic acid ethyl ester (0.15 mole) and 1.85 g. of the hydrochloride of benzimidic acid ethyl ester is heated under vacuum (200 mmHg.) for 5 hours at about 90°C and for 2 hours at about 125°C. Then 2.98 g. of benzimidic acid ethyl ester (0.02 mole) are added and the mixture is heated for further 16 hours at about 125°C under vacuum. All volatile materials are eliminated by distilling off at 125°C and 5 mmHg. The crude solid residue is cyclized by heating for five hours in 150 ml. of ethanol containing 1.2 g. of 80% sodium hydride (0.040 mole). The reaction mixture is then evaporated to dryness in vacuo and then dissolved in dichloromethane. The organic solution, after washing with water, is evaporated and the crude residual compound is crystallized from 50% ethanol yielding 2.05 g. (83%) of the title compound. M.p. 85°–86°C.

EXAMPLE 2

2-Phenyl-s-triazolo[5,1-a]isoquinoline.

A mixture of 0.5 g. (0.002 -phenyl-5,6-dihydro-s-triazolo[mole) of 2-phenyl-5,6-dihydro-s-triazolo[5,1-a]isoquinoline and 0.28 g. (0.002 mole) of N-bromoacetamide in 10 ml. of carbon tetrachloride is refluxed for five hours. The crystalline precipitate which forms is filtered and dissolved with methylene chloride. The resulting solution is washed with sodium bicarbonate, then the solvent is evaporated off and the obtained residue recrystallized from ethyl acetate. Yield 79%. M.p. 158°–9°C.

EXAMPLE 3

2-Phenyl-s-triazolo[5,1-a]isoquinoline.

The title compound may also be prepared following substantially the operative scheme of Example 2, but using wet manganese dioxide as the dehydrogenating agent. Wet manganese dioxide is prepared as described by E. Pratt and J. Van de Castle in Jour. Org. Chem., 26, 2973, 1961and before the use it is suspended in benzene, according to the procedure outlined by J. Goldman in Jour. Org. Chem. 34, 1979, 1969. Yield of this process: 56%.

EXAMPLE 4

A vial for injectable use is prepared from

| | |
|---|---|
| 2-phenyl-s-triazole[5,1-a]isoquinoline | 30 mg. |
| benzyl benzoate | 300 mg. |
| sesame oil q.s. to 2 ml. | |

EXAMPLE 5

A vial for injectable use is prepared from

| | |
|---|---|
| 2-phenyl-5,6-dihydro-s-triazole[5,1-a]isoquinoline | 30 mg. |
| benzyl alcohol | 100 mg. |
| peanut oil q.s. to 2 ml. | |

EXAMPLE 6

A sugar coated tablet is prepared from

| | |
|---|---|
| 2-Phenyl-s-triazolo[5,1-a]isoquinoline | 400 mg. |
| sodium carboxy methylcellulose | 15 mg. |
| magnesium stearate | 15 mg. |
| gelatin | 20 mg. |
| starch | 20 mg. |
| saccharose | 80 mg. |
| gum arabic, lactose, titan dioxide, aluminum lac according to conventional procedures. | |

EXAMPLE 7

100 mg. of solution for oral use are prepared from:

| | |
|---|---|
| 2-Phenyl-5,6-dihydro-s-triazolo[5,1-a]isoquinoline | 700 mg. |
| hydroxyethylcellulose | 0.5 mg. |
| saccharine | 20 mg. |
| water q.s. to 100 ml. | |

We claim:
1. The method of inducing the termination of a pregnancy in an impregnated female animal which com- prises orally or parenterally administering to said animal an abortifacient effective amount of a compound selected from the group consisting of 2-phenyl-5,6-dihydro-s-triazolo [5,1-a]-isoquinoline, 2-phenyl-s-triazolo [5,1-a]-isoquinoline and pharmaceutically acceptable acid addition salts of said compounds.

2. The method of claim 1, wherein the active compound is administered at a daily dosage varying from about 0.8 to about 50 mg/kg. of animal body weight.

* * * * *

UNITED STATES PATENT AND TRADEMARK OFFICE
CERTIFICATE OF CORRECTION

PATENT NO. : 3,895,113
DATED : July 15, 1975
INVENTOR(S) : Amedeo Omodei-Sale, et al.

It is certified that error appears in the above-identified patent and that said Letters Patent are hereby corrected as shown below:

Column 1, line 5, "2-Phenyl-s-triaxolo" should read --2-Phenyl-s-triazolo--;

Column 1, line 6, "triaxolo" should read --triazolo--;

Column 1, line 15, "triaxolo" should read --triazolo--;

Column 1, line 45, "2-amino3" should read --2-amino-3--;

Column 1, line 45, "1(2)-one" should read --1(2H)-one--;

Column 1, line 53, "Belgin" should read --Belgian--;

Column 2, line 57, "5,1-a]" should read --[5,1-a]--;

Column 2, line 58, "maybe" should read --may be--;

Column 2, line 63, insert comma after word tetraacetate;

Column 3, line 54, "(days 4-[])." should read --(days 4-8).--;

Column 4, line 3, should have title of "TABLE I";

Column 4, line 33, "[5,1a]" should read --[5,1-a]--;

Column 4, line 65, "polyoxythylene" should read --polyoxyethylene--;

Column 5, line 51, "22.3" should read --22.3 g.--;

Column 5, line 66, "2.05 g." should read --20.5 g.--;

UNITED STATES PATENT AND TRADEMARK OFFICE
CERTIFICATE OF CORRECTION

PATENT NO. : 3,895,113
DATED : July 15, 1975
INVENTOR(S) : AAmedeo Omodei- Sale, et al.

It is certified that error appears in the above-identified patent and that said Letters Patent are hereby corrected as shown below:

Column 6, Line 4 & 5, "(0.002 -phenyl 5,6-dihydro-s-triazolo[mole)" should read --(0.002 mole)--.

Signed and Sealed this twenty-fourth Day of February 1976

[SEAL]

Attest:

RUTH C. MASON
Attesting Officer

C. MARSHALL DANN
Commissioner of Patents and Trademarks